E. N. WHITE.
PANORAMIC TRIPOD HEAD.
APPLICATION FILED SEPT. 9, 1911.
1,083,575.
Patented Jan. 6, 1914.
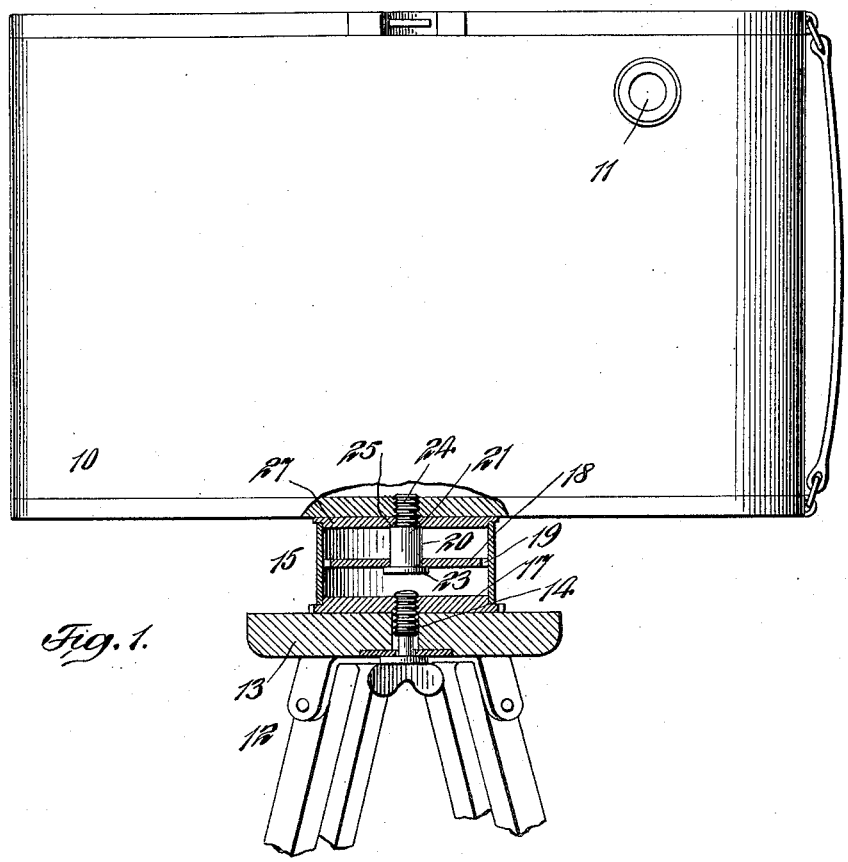
Fig. 1.
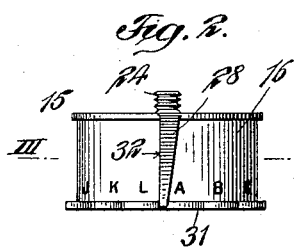
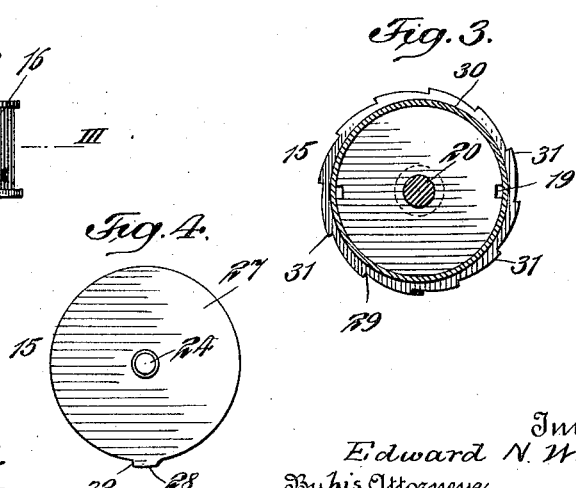
Witnesses:
Inventor
Edward N. White
By his Attorneys
Criswell & Criswell

UNITED STATES PATENT OFFICE.

EDWARD N. WHITE, OF NEW YORK, N. Y., ASSIGNOR OF ONE-HALF TO JACOB F. OBERLE, OF NEW YORK, N. Y.

PANORAMIC TRIPOD-HEAD.

1,083,575. Specification of Letters Patent. Patented Jan. 6, 1914.

Application filed September 9, 1911. Serial No. 648,513.

*To all whom it may concern:*

Be it known that I, EDWARD N. WHITE, a citizen of the United States, and a resident of New York, borough of Richmond, county of Richmond, and State of New York, have invented certain new and useful Improvements in Panoramic Tripod-Heads, of which the following is a full, clear, and exact description.

This invention relates more particularly to a device for use in connection with means for taking panoramic photographs in a manner disclosed in my Patent No. 928,724, dated July 20, 1909.

According to the invention disclosed in the patent referred to, the film is arranged in the camera and shifted successively in the ordinary way and each picture exposed as usual to provide a succession of views upon the same film. Instead, however, of the film being moved so as to make a succession of distinct pictures, the film is so moved that the view to be taken at each exposure will overlap a certain distance that of the preceding picture. This overlapping portion is blended or merged together by the use of what I term a blender, so that the picture when completed will be absolutely continuous. According to this invention, the camera is moved in the arc of a circle corresponding to the view to be taken, and for this purpose the camera is mounted upon a tripod in order that the same may be held against unnecessary vibration while taking the picture and to permit time exposure to be given if such is necessary or desirable. It is necessary to indicate not only the distance the film is moved but also the distance the camera is moved for each exposure. In my patent, a dial was shown for this purpose, but such means was not entirely satisfactory, particularly as such dial, where the tripod had a metallic head, had to be fitted specially. As each tripod is provided with a screw, it is desirable that an attachment be provided which is applicable to all tripods as made, without any alteration whatever so that the attachment could be sold as a separate device and readily placed in position for use.

The primary object of the invention is to provide a simple and efficient device which will overcome the objectionable features of a dial or similar means, and which attachment may be readily applied to the tripod as sold whether provided with a wood or a metallic head, and so to construct the device that a proper and effective adjustment may be obtained at each movement of the camera with very little effort on the part of the operator.

Another object of the invention is to provide a simple and efficient device which may be readily attached to the tripod and to the camera and so held that the camera may be properly supported to rotate thereon.

A further object of the invention is to provide simple means whereby each movement of the camera may be readily ascertained and the camera practically locked in such position.

With these and other objects in view, the invention will be hereinafter more particularly described with reference to the accompanying drawings, which form a part of this specification, and will then be pointed out in the claims at the end of the description.

In the drawings, Figure 1 is a vertical section, partly in elevation, of one form of device embodying my invention, showing the same applied to a tripod and camera of the ordinary type, known as the pocket-folding kodak. Fig. 2 is a detail side elevation of the device. Fig. 3 is a sectional plan view taken on the line III—III of Fig. 2; and Fig. 4 is a plan view of the device.

The camera 10 may be of the usual type having a sight opening 11 whereby the marking on the film may be seen to determine the exact length of movement of said film after each exposure, and adapted to support the camera is a tripod 12 having its head 13 provided with a screw 14 which may be independent of the tripod or securely held to or formed as a part of the head, according to whether the tripod is made of wood or metal, the said camera and tripod being of the usual or of any preferred construction.

A device 15 forming an attachment has a cylindrical body 16. This body 16 is closed at one end by a head or disk 17 which may be separate from or formed integral with said body 16. This head 17 has a threaded aperture which is adapted to be engaged by the threaded end of a screw 14 which serves to hold the said head and body 16 against movement thereon. The body 16 has a disk or member 18 arranged within the same and said disk may be separate from the body to adapt it to be readily inserted within said body and then securely held therein or the said disk may be otherwise arranged and made. This disk if separate may have two peripheral slots 19 to adapt a wire or other device to be used for holding the disk while it is being inserted in position within the body 16, and said disk is provided with an aperture through which passes the body 20 of a bolt 21. This bolt has a reduced threaded portion 24 which forms a shoulder 25 with the body of the screw. A disk, member or turn-table 27 has an aperture through which the threaded part 24 of the screw passes, and said part 24 also passes into a screw threaded aperture in the camera bottom, as usual in such devices. Said member 27 rests upon the shoulder 25 of the screw and upon the upper edge of the body 16 and in such a way that the camera may be made to engage the threaded part 24 and to be held to the plate or table 27 with which it is movable. By this means the camera may be rotated with the member 27 and screw 21, or on the screw, and in the arc of a circle and to any extent desired. The weight of the camera will hold same in position on the body 16 and tilting or tipping thereof is prevented by the disk 18 held in position by the bolt 21.

To determine the distance that the camera is to be moved at each exposure according to the marking on the film and the distance the same is to be moved, various means may be employed. As shown the table or plate 27 has a spring finger, dog or part 28 which may be separate from or integral therewith, and which dog extends downward and is adapted to engage successively a series of notches 29 formed on the peripheral edge of the head 17, a part of which, as 30, projects beyond the body 16. The notches 29 may be formed as a part of teeth so that the camera can be moved in one direction only and in such a way that the dog 28 immediately that it passes the largest part or shoulder 31 will immediately spring into one of the notches 29, and if the camera should be moved too great a distance, the camera can be moved backward until the lower end of the straight edge 32 of the dog 28 engages the straight portion of the tooth forming the notch 29. Thus it will not be necessary to be careful as to the exact movement of the camera for the reason that the camera can be moved back a short distance and will always be positively held and substantially locked in such position.

In starting to take a panoramic picture, the camera is held to the device as shown, and the spring dog 28 is made to engage the notch at the point of starting. This starting point may be indicated by the letter A and the succession of notches or teeth may be indicated by letters or other characters so that substantially the entire circuit or a complete circuit may be made by the camera.

It will be understood, of course, that the spacing of the notches 29 will accord with the marking on the film and such spacing and marking will vary according to the size of the camera and the length of film to be moved at each exposure. It will be also understood that the device may be variously constructed and arranged to adapt it for the purpose intended. It will be further understood that the letters or characters on the device may run from right to left or vice versa according to the make of the camera; and that instead of holding the bolt to which the camera is secured in the manner shown, the thread of the bolt may be extended and two nuts which may be locked together may be employed.

From the foregoing, it will be seen that a simple and efficient device or attachment is provided whereby a camera may be rotatably mounted upon a tripod and the camera moved positively and accurately a predetermined distance to adapt the camera for taking panoramic or other pictures; that said device is simple in construction and may be cheaply and readily made; that said device may be made to positively hold the camera at each movement; and that said device may be made and sold as an attachment entirely independent of the tripod and camera or as a part of a tripod if desired.

Having thus described my invention, I claim as new and desire to secure by Letters Patent:—

1. A device of the character described, comprising a cylindrical body, a head provided with peripheral teeth forming notches and held to said body, said head having a threaded aperture adapted to receive the threaded end of a screw, a disk member arranged within said body, a screw held to said disk and provided with a threaded end for attachment to a camera, a rotatable disk-like member fitting about the screw and adapted to be rigidly held to the camera, and a dog integral with said disk-like member and adapted to engage the teeth of said head.

2. A device of the character described, comprising a body having means provided with peripheral teeth forming notches and having a threaded aperture adapted to receive the threaded end of a screw, a screw held to said body and provided with a threaded end for attachment to a camera, a rotatable member fitting about the screw and adapted to be held to the camera, and a part movable with said member and adapted to engage said teeth.

3. A device of the character described, comprising a cylindrical body, a head provided with peripheral teeth and held to said body, said head having a threaded aperture adapted to receive a threaded end of a screw, a disk-like member arranged within said body, a screw held to said disk and provided with a threaded end for attachment to a camera, a rotatable disk-like member fitting about the screw and adapted to be held to the camera, and means movable with said member adapted to engage said teeth.

4. A device of the character described, comprising a cylindrical body provided with teeth, a screw provided with a threaded end for attachment to a camera, a rotatable member fitting about the screw and adapted to be held to the camera, and a dog integral with said disk-like member and adapted to engage said teeth.

5. A device of the character described, comprising a body provided with teeth, a screw provided with a threaded end for attachment to a camera, a rotatable member fitting about the screw and adapted to be held to the camera, and means movable with said member and adapted to engage the teeth.

This specification signed and witnessed this 6th day of September, A. D. 1911.

EDWARD N. WHITE.

Witnesses:
FRANCES KINREICH,
L. I. MAYER.

---

Copies of this patent may be obtained for five cents each, by addressing the "Commissioner of Patents, Washington, D. C."